United States Patent
Su et al.

(10) Patent No.: US 11,849,247 B2
(45) Date of Patent: Dec. 19, 2023

(54) MAGNETIC TEMPLATE WITH ADJUSTABLE MAGNETIC FORCE AND DISPLAY DEVICE USING THE SAME

(71) Applicant: Qisda Corporation, Taoyuan (TW)

(72) Inventors: Yung-Chun Su, Taoyuan (TW);
Hung-Mao Chen, Taoyuan (TW);
Hui-Chieh Hu, Taoyuan (TW);
Hsin-Che Hsieh, Taoyuan (TW);
Shih-An Lin, New Taipei (TW);
Kuan-Hsu Lin, New Taipei (TW);
Hsin-Hung Lin, Taoyuan (TW);
Jen-Feng Chen, Taichung (TW);
Hao-Chun Tung, Taoyuan (TW);
Yang-Zong Fan, Taoyuan (TW);
Chih-Ming Chang, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/708,057

(22) Filed: Mar. 30, 2022

(65) Prior Publication Data
US 2023/0231969 A1 Jul. 20, 2023

(30) Foreign Application Priority Data

Jan. 19, 2022 (CN) .......................... 202210060419.0

(51) Int. Cl.
*F16M 13/02* (2006.01)
*H04N 5/655* (2006.01)
*F16M 11/04* (2006.01)

(52) U.S. Cl.
CPC ........... *H04N 5/655* (2013.01); *F16M 11/041* (2013.01); *F16M 13/022* (2013.01)

(58) Field of Classification Search
CPC ..... H04N 5/655; F16M 11/041; F16M 13/022
See application file for complete search history.

(56) References Cited

U.S. PATENT DOCUMENTS

| | | | |
|---|---|---|---|
| 2021/0026409 A1* | 1/2021 | Miles | F16M 11/041 |
| 2022/0336260 A1* | 10/2022 | Shindo | B65G 43/08 |
| 2023/0031813 A1* | 2/2023 | Leigh | H01F 38/14 |
| 2023/0138312 A1* | 5/2023 | Cho | G05G 5/06 74/491 |

* cited by examiner

*Primary Examiner* — Amy J. Sterling

(57) ABSTRACT

A magnetic template with adjustable magnetic force is provided. The magnetic template is applied to a display device. The display device can be fixed on a plane by the magnetic template, wherein the magnetic template includes an assembly shell and an adjustment element. A magnetic element is arranged inside the assembly shell. The adjustment element is arranged in the assembly shell and is configured to adjust the magnetic force of the magnetic element relative to the plane or adjust the magnetic force of the magnetic element.

19 Claims, 15 Drawing Sheets

MAGNETIC TEMPLATE WITH ADJUSTABLE MAGNETIC FORCE AND DISPLAY DEVICE USING THE SAME

This application claims the benefit of People's Republic of China application Ser. No. 202210060419.0, filed Jan. 19, 2022, the subject matter of which is incorporated herein by reference.

BACKGROUND OF THE INVENTION

Field of the Invention

The invention relates in general to a display device, and more particularly to a magnetic template with adjustable magnetic force and a display device using the same.

Description of the Related Art

A display device is equipped with a supporting frame (stands) or extra wall-mount accessories, so that the display device can be firmly erected on a desktop or mounted on a wall. However, consumers need to pay for these extra stands or wall-mount accessories, which weigh a lot and take a tremendous effort to move. Besides, the wall-mount accessories are mounted on a wall through the coupling between a supporting frame fixed on the wall and a bracket disposed on the back of the display. However, the supporting frame and the bracket take up space and are portable unfriendly, and therefore cannot meet consumers' requirements.

SUMMARY OF THE INVENTION

The invention is directed to a magnetic template with adjustable magnetic force and a display device using the same, wherein the magnetic template can be arranged on the display device according to consumers' needs.

According to one embodiment of the present invention, a magnetic template with adjustable magnetic force is provided. The magnetic template is applied to a display device. The display device can be fixed on a plane by the magnetic template, wherein the magnetic template includes an assembly shell and an adjustment element. A magnetic element is arranged inside the assembly shell. The adjustment element is arranged in the assembly shell and is configured to adjust the magnetic force of the magnetic element relative to the plane or adjust the magnetic force of the magnetic element.

According to another embodiment of the present invention, the magnetic template with adjustable magnetic force further includes an operation element configured to operate the adjustment element, so that the adjustment element can move between a first position and a second position inside the assembly shell.

According to an alternate embodiment of the present invention, a display device including a display and a magnetic template with adjustable magnetic force is provided. The magnetic template with adjustable magnetic force is disposed on a display, which can be fixed on a plane by the magnetic template. The magnetic template includes an assembly shell and an adjustment element. A magnetic element is arranged inside the assembly shell. The adjustment element is arranged in the assembly shell and is configured to adjust the magnetic force of the magnetic element relative to the plane or adjust the magnetic force of the magnetic element.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical solutions for the embodiments of the present application are clearly and thoroughly disclosed with accompanying drawings. Obviously, the embodiments disclosed below are only some rather than all of the embodiments of the present invention. Here below, similar/identical designations are used to indicate similar/identical elements.

Figure 1A:
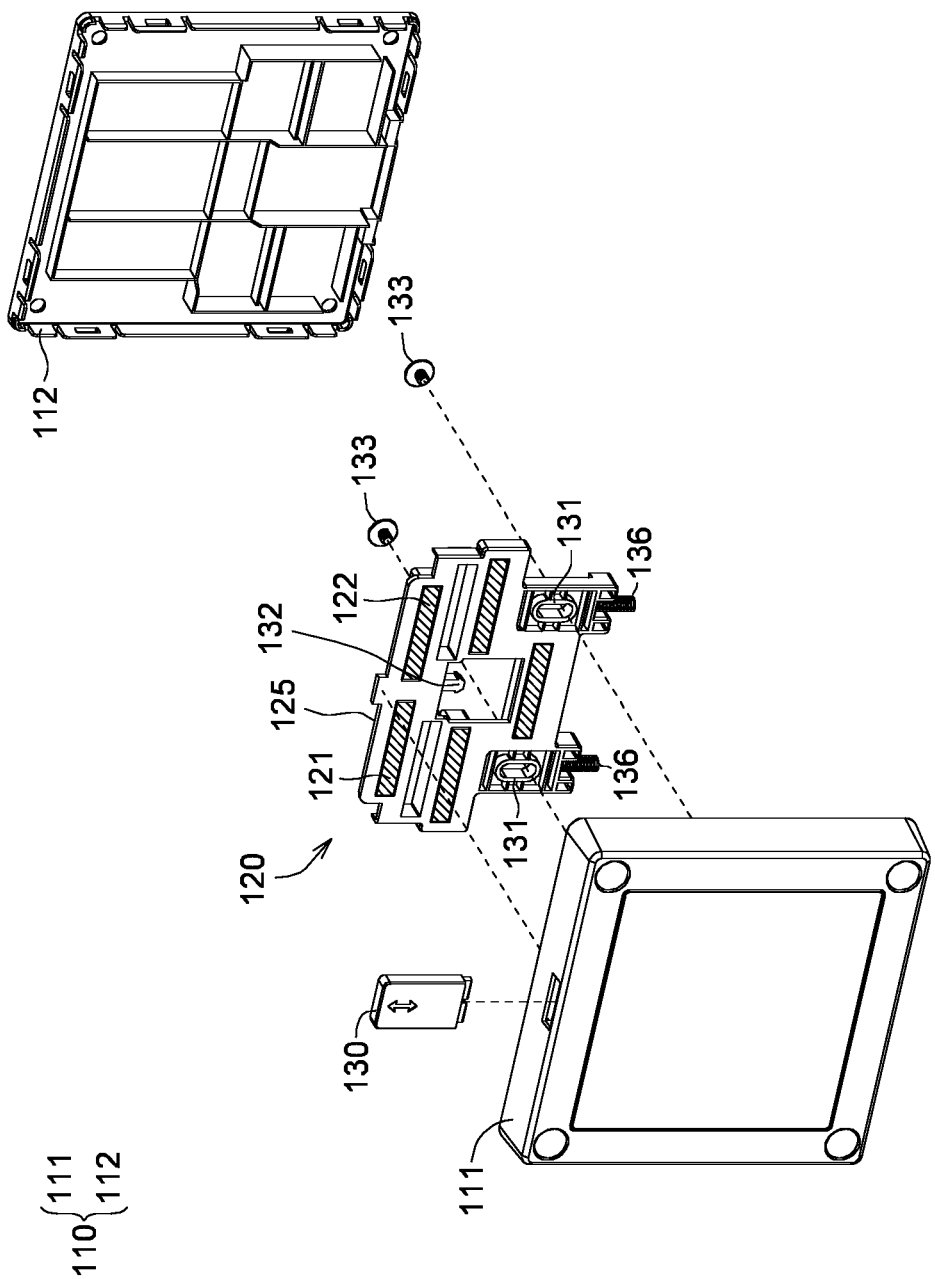
FIGS. 1A and 1B respectively are explosion diagrams of a magnetic template according to an embodiment of the present invention.
Figure 1B:
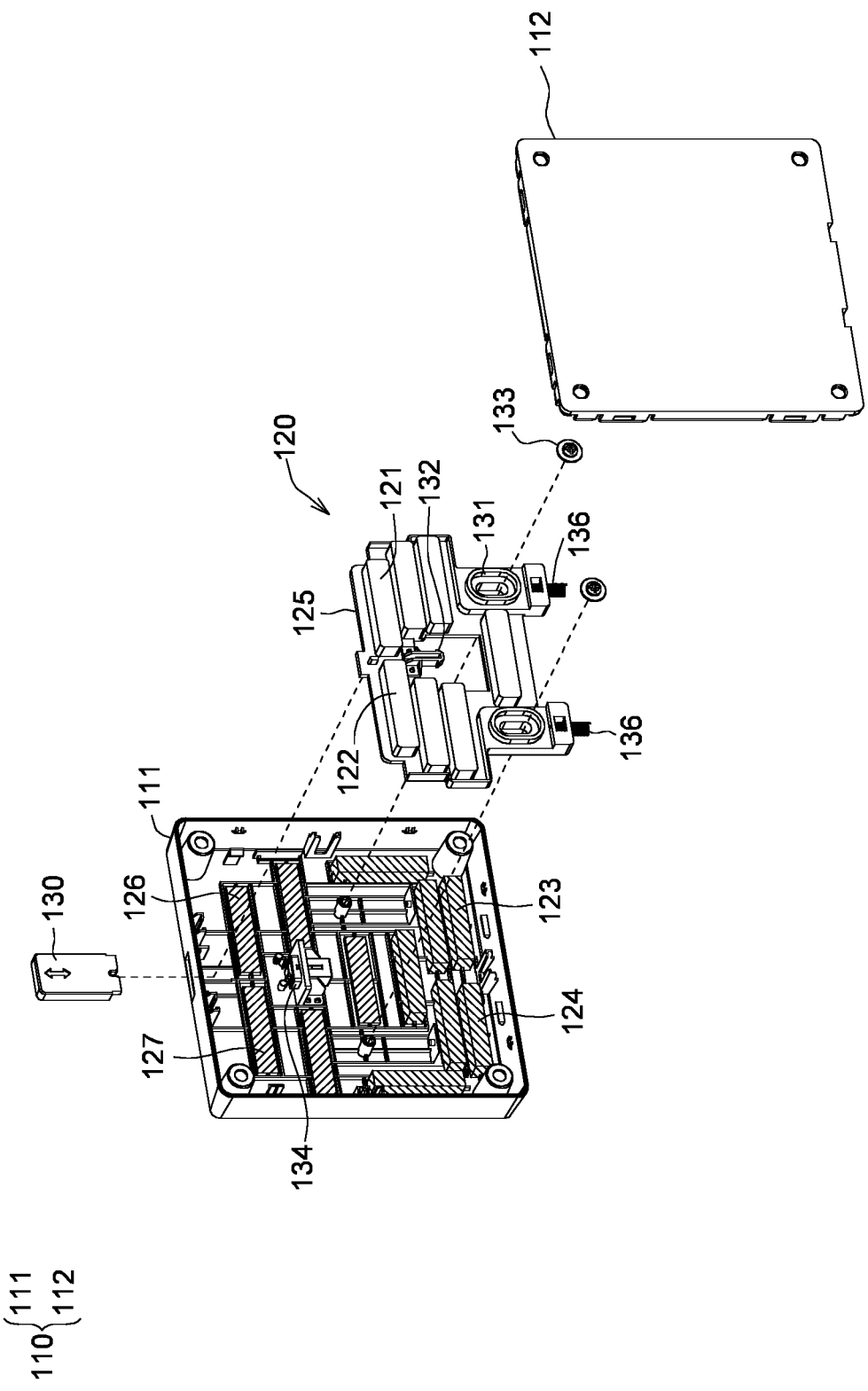
Figure 2A:
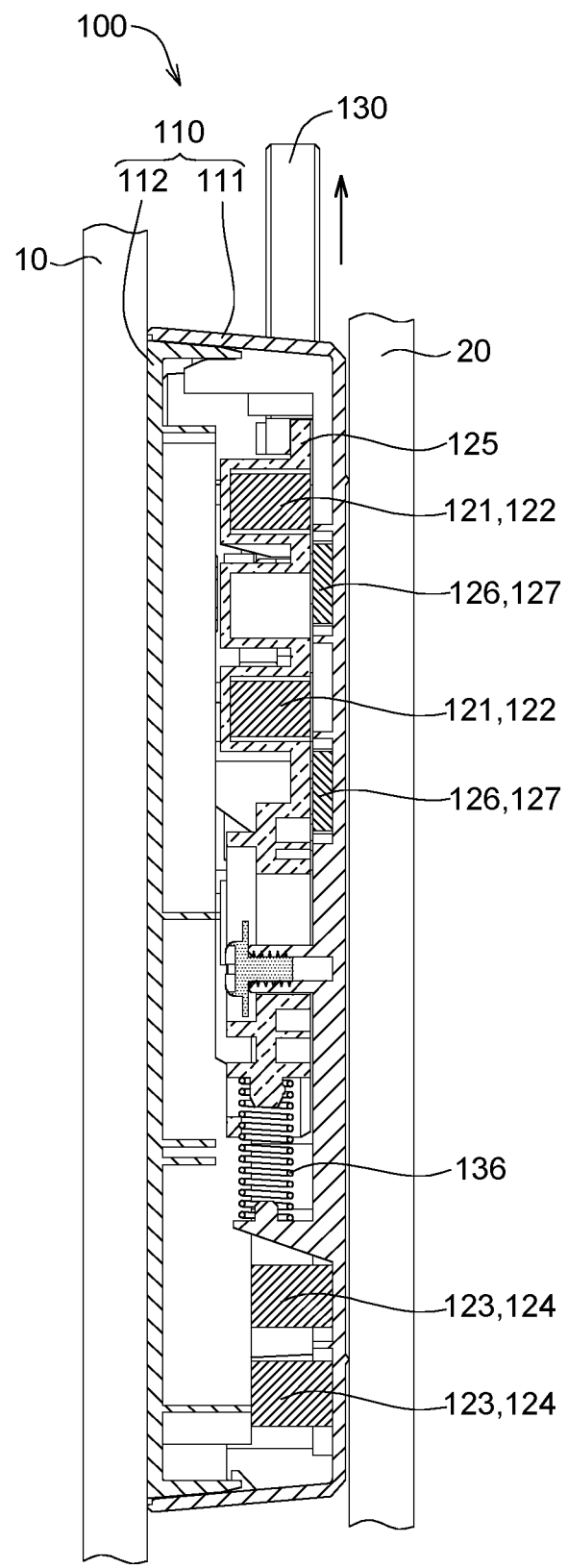
FIGS. 2A and 2B are cross-sectional view of a display fixed on a plane by the magnetic template according to an embodiment of the present invention.
Figure 2B:
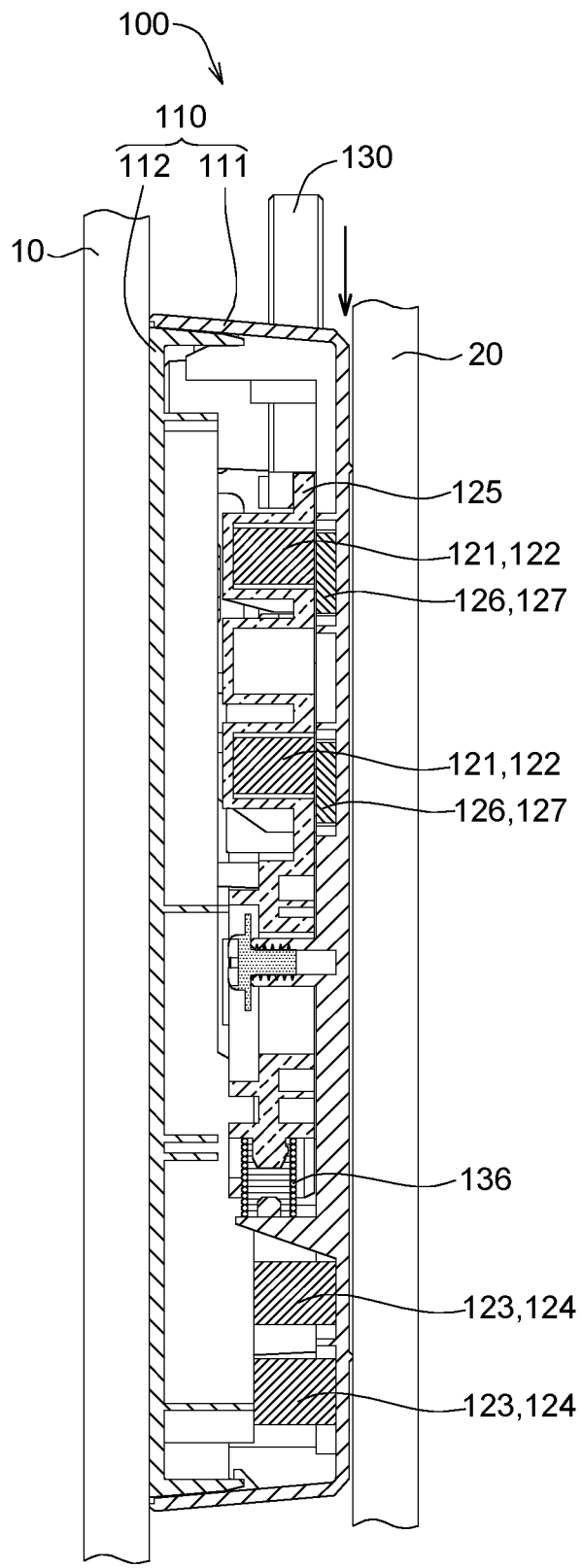

Referring to FIGS. 1A and 1B, explosion diagrams of a magnetic template 100 according to an embodiment of the present invention are respectively shown. In an embodiment, the magnetic template 100 is applied to a display device (the display 10), which can be fixed on a plane 20 by the magnetic template 100, as indicated in FIGS. 2A and 2B.

The magnetic template 100 includes an assembly shell 110 and an adjustment element 120. A plurality of magnetic elements 121-124 is arranged inside the assembly shell 110. The adjustment element 120 is arranged in the assembly shell 110 and is configured to adjust the magnetic force of the magnetic elements 121-122 or the magnetic force of a part of the magnetic elements 121-124 relative to the plane 20. Additionally, the magnetic template 100 may further include an operation element 130 configured to operate the adjustment element 120. The magnetic elements 121-124 can be implemented by such as permanent magnets or electromagnet.

The assembly shell 110 is composed of an upper cover 111 and a lower cover 112. The adjustment element 120 can be moveably disposed between the upper cover 111 and the lower cover 112. The adjustment element 120 can adjust the magnetic force of the magnetic elements 121-122 relative to the plane 20 or the magnetic force of the magnetic elements 121-124 by different ways. For example, the magnetic force of the magnetic elements 121-124 can be adjusted by adjusting the attraction area, the attraction distance, and the electromagnet current value or by changing the material between the magnetic elements 121-124 and the plane 20, but the present invention is not limited thereto. In an embodiment, the attraction area, the attraction distance, and the materials with different magnetic conductivities between the magnetic elements 121-124 and the plane 20 can be changed by vertically or horizontally moving relative positions between the adjustment element 120 and the magnetic elements 121-124. In another embodiment, the electromagnet current value of the magnetic elements 121-124 can be changed by controlling the magnitude of the magnetic field generated when the current flows through the coil. In the embodiments below, details of how the adjustment element 120 adjusts the magnetic force of the magnetic elements 121-124 relative to the plane 20 are disclosed, and different embodiments can be combined to form another embodiment.

Refer to FIGS. 1A and 1B. The adjustment element 120 includes a sliding plate 125 and at least one shields 126-127. The sliding plate 125 is disposed on the upper cover 111. The sliding plate 125 can move between the first position and the second position relative to the upper cover 111. For example, the sliding plate 125 has two limiting slots 131 and two fixing elements 133 (such as screw rods) located inside the two limiting slots 131. The fixing element 133 can pass through the limiting slot 131 to be fixed on the stud of the upper cover 111. The limiting slot 131, such as a rectangular slot, is configured to limit the movement of the sliding plate 125 between the first position and the second position. Besides, the operation element 130 is disposed in an opening on the upper cover 111, and the bottom of the operation element 130 is connected with the sliding plate 125 for driving the sliding plate 125 to move up and down in a moving direction.

Furthermore, the shields 126-127 are disposed on the upper cover 111 and are opposite to the sliding plate 125, so that the shields 126-127 are located on the opposite side of the sliding plate 125. As indicated in FIG. 1B, first magnetic elements 121 and second magnetic elements 122 are disposed on the left and right sides of the sliding plate 125. First shield 126 and second shield 127 are disposed on the left and right sides of the upper cover 111, wherein the first shield 126 is located on the opposite side of the first magnetic element 121, and the second shield 127 is located on the opposite side of the second magnetic element 122. The shields 126-127 are formed of a material selected from elements of the iron group. The iron group is composed of elements such as iron, cobalt and nickel having similar properties. The iron group has ferromagnetic property and can be attracted with the magnetic elements 121-122. When the shields 126-127 are close to the magnetic elements 121-122, the magnetic force of the magnetic elements 121-122 relative to the plane 20 is shielded by the shields 126-127 and becomes weakened. Therefore, the adjustment element 120 of the present embodiment can change the magnetic force of the magnetic elements 121-122 relative to the plane 20 by adjusting the attraction area of the magnetic elements 121-122 relative to the plane 20.

Referring to FIGS. 2A and 2B, cross-sectional views of a display 10 fixed on a plane 20 by the magnetic template 100 according to an embodiment of the present invention are shown. The display 10 can be implemented by a liquid crystal display. The magnetic template 100 can be arranged on or detachably disposed on the back of the display 10. Since the magnetic template 100 and the plane 20 are attracted and fixed by a magnetic force, there is no need to arrange a supporting frame (or stand) for fixing the display 10. The magnetic template 100 can be detachably disposed on the display 10 according to Video Electronics Standards Association (VESA) standard, wherein the VESA standard, which belongs to the VESA wall mounting specification, allows the display 10 to be mounted on a wall through the magnetic template 100. The plane 20 can be implemented by a magnet or a material selected from elements of the iron group.

As indicated in FIG. 2A, when the operation element 130 drives the sliding plate 125 to the first position, the shields 126-127 and the magnetic elements 121-122 are not located at relative attraction positions, therefore the magnetic force of the magnetic elements 121-122 relative to the plane 20 is not shielded by the shields 126-127 and therefore is not weakened. Or, the magnetic force of the magnetic elements 121-122 relative to the plane 20 is partly shielded, but the magnetic force is not too weak to fix the display 10 on a plane 20 through the magnetic template 100. As indicated in FIG. 2B, when the operation element 130 drives the sliding plate 125 to the second position, the shields 126-127 and the magnetic elements 121-122 are located at relative attraction positions, and the magnetic force of the magnetic elements 121-122 relative to the plane 20 is shielded by the shields 126-127 and becomes weakened. When the sliding plate 125 is located at the second position, the magnetic force of the first magnetic element 121 and the second magnetic element 122 relative to the plane 20 is weakened, but the magnetic force of the third magnetic elements 123 and the fourth magnetic elements 124 located under the sliding plate 125 relative to the plane 20 is not weakened and is able to temporarily fix the display 10, such that the user can detach the display 10 and the magnetic template 100 from the plane 20 under the attraction of a smaller magnetic force.

Moreover, as indicated in FIG. 1B, the adjustment element 120 may further include a buckling piece 132, a buckling switch 134 and at least one elastomer 136 (two are illustrated in the diagram). The buckling piece 132 is disposed on the sliding plate 125 and is opposite to the buckling switch 134 in a moving direction. The buckling switch 134 is disposed on an upper cover 111. Besides, the elastomer 136 is disposed on one side of the sliding plate 125 (such as the bottom side). When the operation element 130 drives the sliding plate 125 to be closer to or farther away from the elastomer 136, the elastomer 136 provides a resilience to the sliding plate 125. In an embodiment, the buckling piece 132 can be inserted into the buckling switch 134 to enter a buckled state, which can be released if the buckling piece 132 is pressed again. Thus, the buckling piece 132 can be protruded outside the buckling switch 134 and enter a separated state.

As indicated in FIG. 2A, when the sliding plate 125 is located at the first position, the elastomer 136 provides a resilience to the sliding plate 125 to push the sliding plate 125 upwards, so that the buckling piece 132 and the buckling switch 134 are in a separated state. As indicated in FIG. 2B, when the sliding plate 125 is located at the second position, the elastomer 136 is pressed downwards, so that the buckling piece 132 can be inserted into the buckling switch 134 and enter a buckled state. Thus, the sliding plate 125 can be fixed at the first position or the second position through the operation of the buckling piece 132, the buckling switch 134 and the elastomer 136, but the present invention is not limited thereto. The sliding plate 125 is located at the first position when the buckling piece 132 and the buckling switch 134 are in one of the separated state and the buckled state; or, the sliding plate 125 is located at the second position when the buckling piece 132 and the buckling switch 134 are in the other one of the separated state and the buckled state.

Figure 3A:
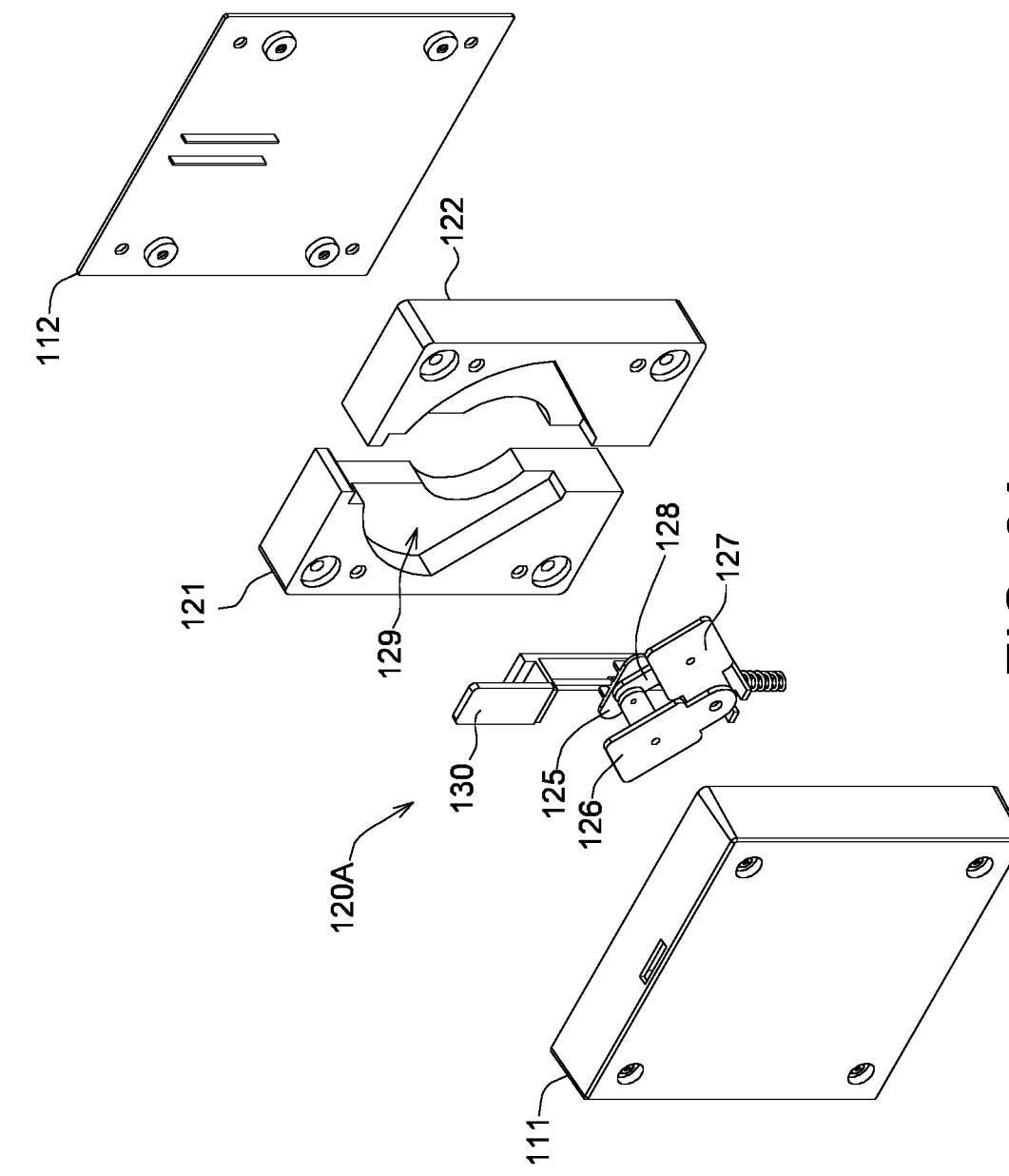
FIGS. 3A and 3B respectively are explosion diagrams of a magnetic template according to an embodiment of the present invention.
Figure 3B:
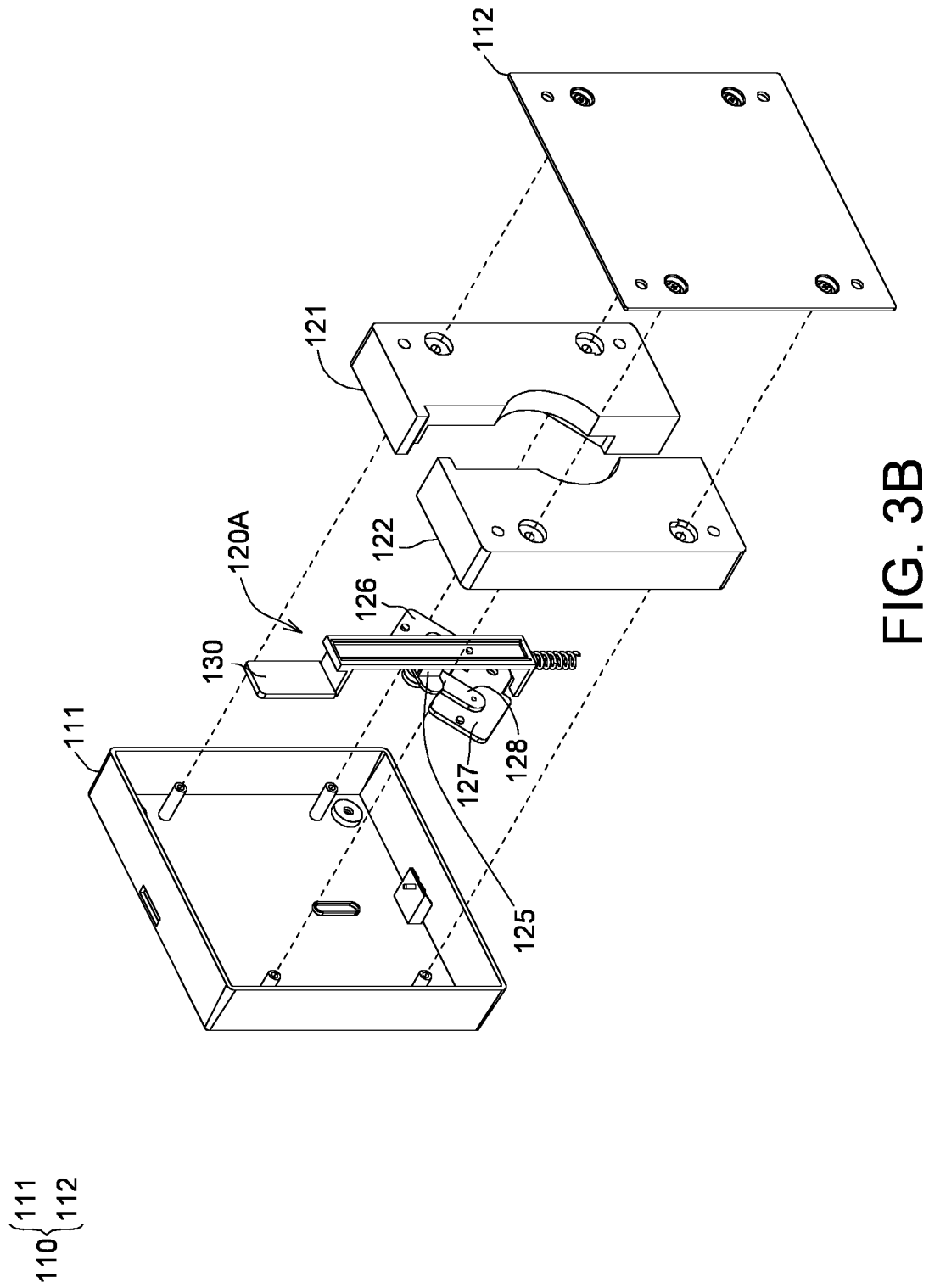
Figure 4A:
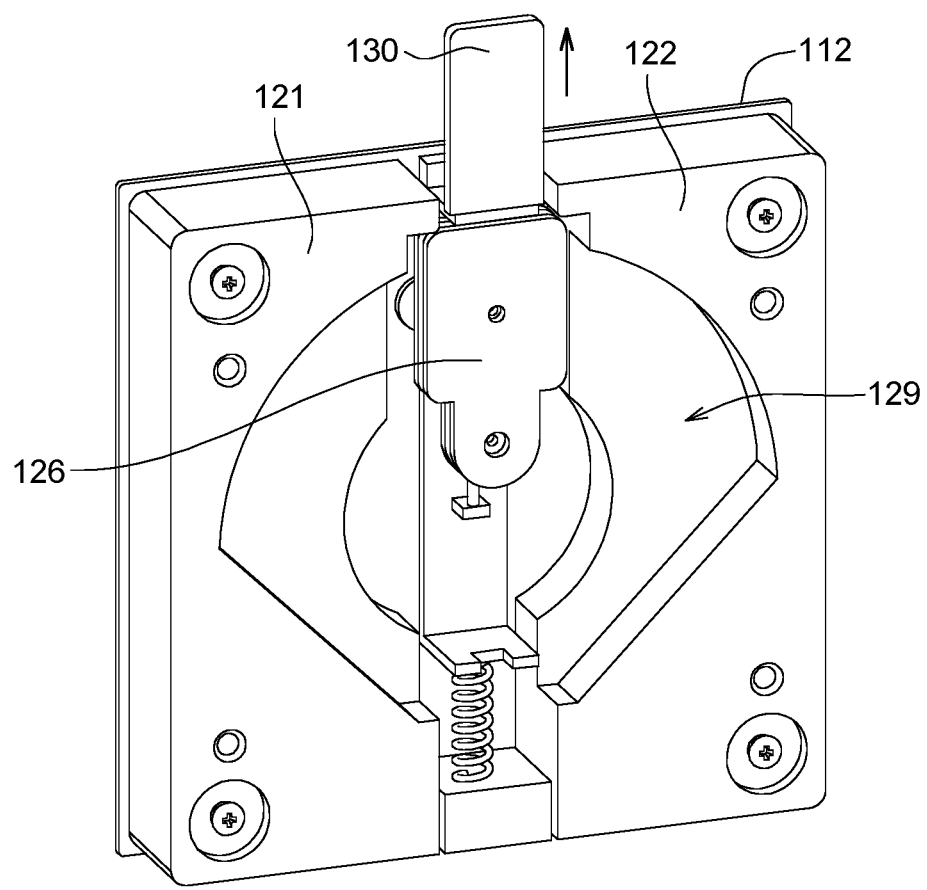
FIGS. 4A and 4B respectively are operation diagrams of an adjustment element of a magnetic template.
Figure 4B:
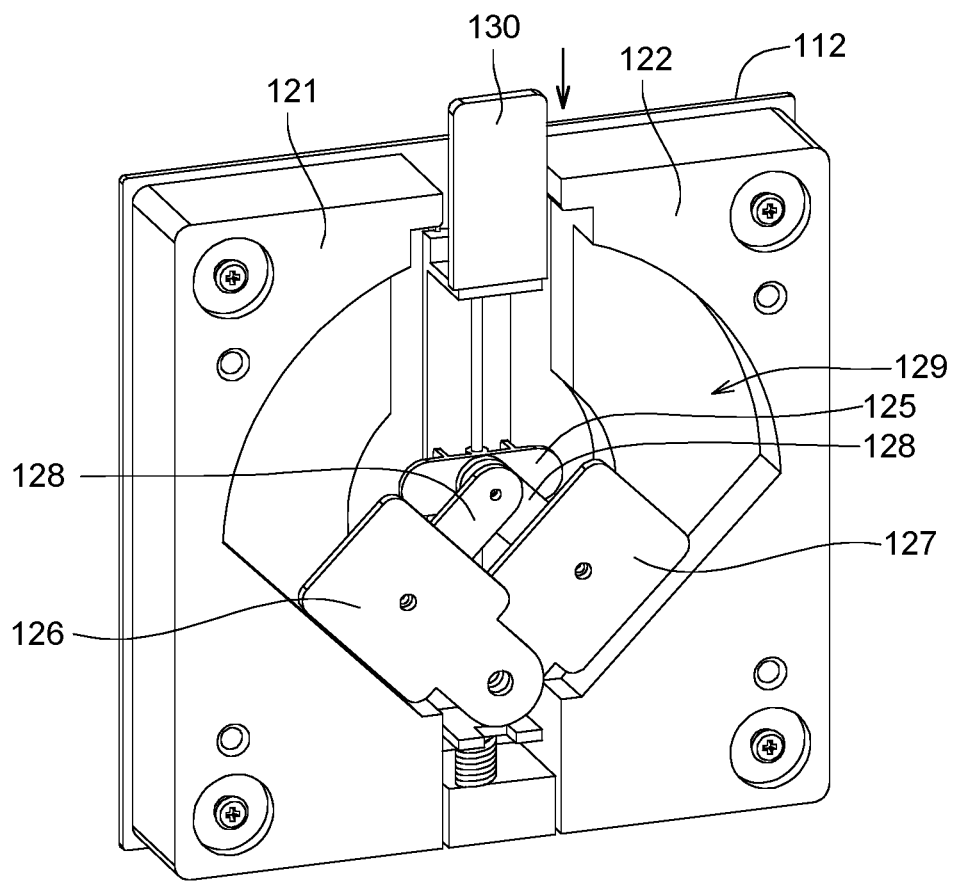

Referring to FIGS. 3A, 3B, 4A and 4B. FIGS. 3A and 3B respectively are explosion diagrams of a magnetic template 101 according to an embodiment of the present invention. FIGS. 4A and 4B respectively are operation diagrams of an adjustment element 120A of the magnetic template 101.

Like the first embodiment, the magnetic template 101 includes an assembly shell 110 and an adjustment element 120A. The magnetic elements 121-122 are disposed inside the assembly shell 110. The adjustment element 120A is arranged in the assembly shell 110 and is configured to adjust the magnetic force of the magnetic elements 121-122 relative to the plane 20. Additionally, the magnetic template 101 may further include an operation element 130 configured to operate the adjustment element 120A. The magnetic elements 121-122 can be implemented by such as permanent magnets or electromagnets.

The adjustment element 120A may include a sliding plate 125, two linking rods 128 (or only one linking rod) and two shields 126-127 (or only one shield). The linking rods 128 and the shields 126-127 can move up and down with the sliding plate 125 to enter a folded state or an unfolded state. The two shields 126-127 can be moveably hinged on one side of the sliding plate 125, and each of the linking rods 128 is hinged between the sliding plate 125 and the two shields 126-127 to achieve the unfolding and folding effects. As indicated in FIG. 3A, the magnetic elements 121-122 respectively have a scalloped slot 129, and the two shields 126-127 can move within the scalloped slots 129. When the sliding plate 125 moves between the first position and the second position, the positions of the two shields 126-127 change accordingly. The two shields 126-127 can be formed of a material selected from elements of the iron group. The iron group is composed of elements such as iron, cobalt and nickel having similar properties. The iron group has ferromagnetic property and can be attracted with the magnetic elements 121-122. When the two shields 126-127 enter an unfolded state, the magnetic force of the magnetic elements 121-122 relative to the plane 20 is shielded by two shields 126-127 and becomes weakened. Therefore, the adjustment element 120 of the present embodiment can change the magnetic force of the magnetic elements 121-122 relative to the plane 20 by adjusting the attraction area of the magnetic elements 121-122 relative to the plane 20.

As indicated in FIG. 4A, when the operation element 130 drives the sliding plate 125 to the first position, two shields 126-127 and the linking rods 128 enter a folded state, and the two shields 126-127 and the magnetic elements 121-122 are not located at relative attraction positions, such that the magnetic force of the magnetic elements 121-122 relative to the plane 20 is not shielded by two shields 126-127 and therefore is not weakened. Or, the magnetic force of the magnetic elements 121-122 relative to the plane 20 is partly shielded, but the magnetic force is not too weak to fix the display 10 on the plane 20 through the magnetic template 101. As indicated in FIG. 4B, when the operation element 130 drives the sliding plate 125 to the second position, the two shields 126-127 and the linking rods 128 enter an unfolded state, so that the two shields 126-127 and the magnetic elements 121-122 are located at relative attraction positions, and the magnetic force of the magnetic elements 121-122 relative to the plane 20 is shielded by the two shields 126-127 and becomes weakened. Thus, the user can detach the magnetic template 101 under the attraction of a smaller magnetic force. The sliding plate 125, the linking rods 128 and the two shields 126-127 are designed to have suitable relative sizes and coupling positions, so that they can smoothly change between the folded state and the open state. For example, when approaching the folded state, the sliding plate 125 is higher than the two shields 126-127, so that they would not interfere with each other. For another example, an avoidance groove is arranged on the opposite far side of the two shields 126-127, so that they would not interfere with each other, etc., this invention does not be limited by these. In addition, the folded state may be completely overlapped as shown in FIG. 4A, or may be partially overlapped, and this invention dose not be limited by this.

Like the embodiments disclosed above, the adjustment element 120A of the present embodiment may include a buckling piece 132, a buckling switch 134 and an elastomer 136; the operations of these element are already disclosed above, and the similarities are not repeated here.

Figure 5A:
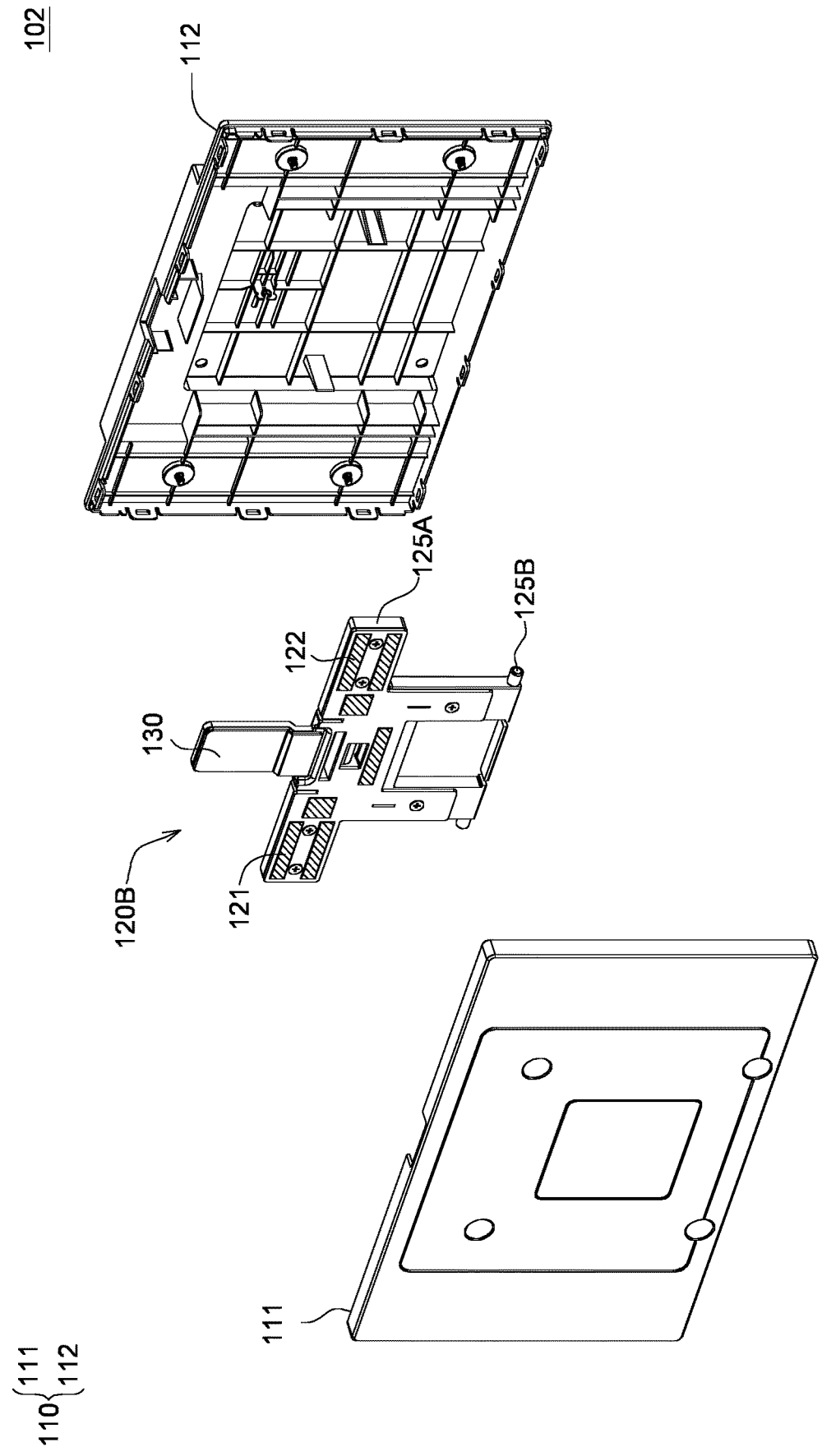
FIGS. 5A and 5B respectively are explosion diagrams of a magnetic template according to an embodiment of the present invention.
Figure 5B:
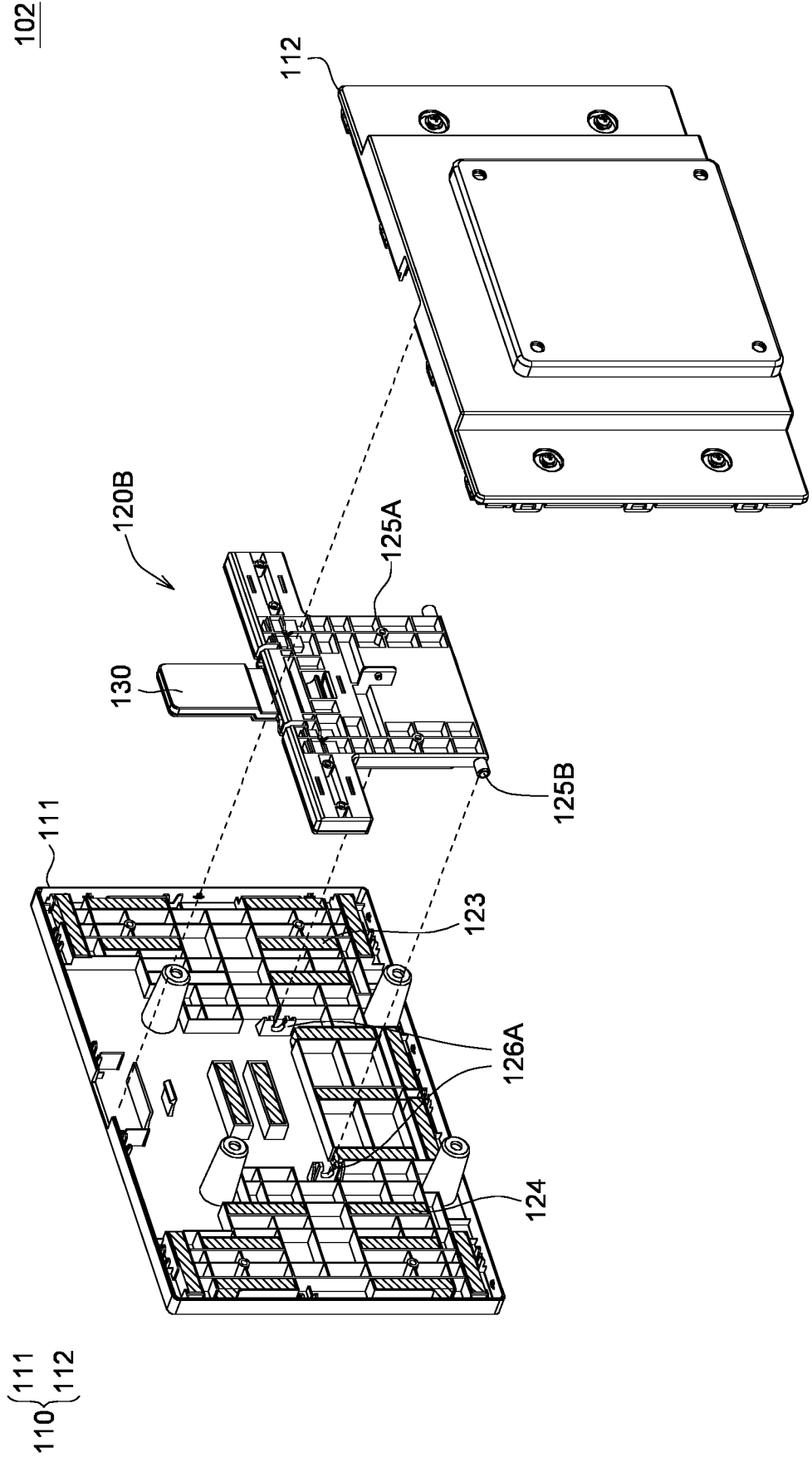
Figure 6A:
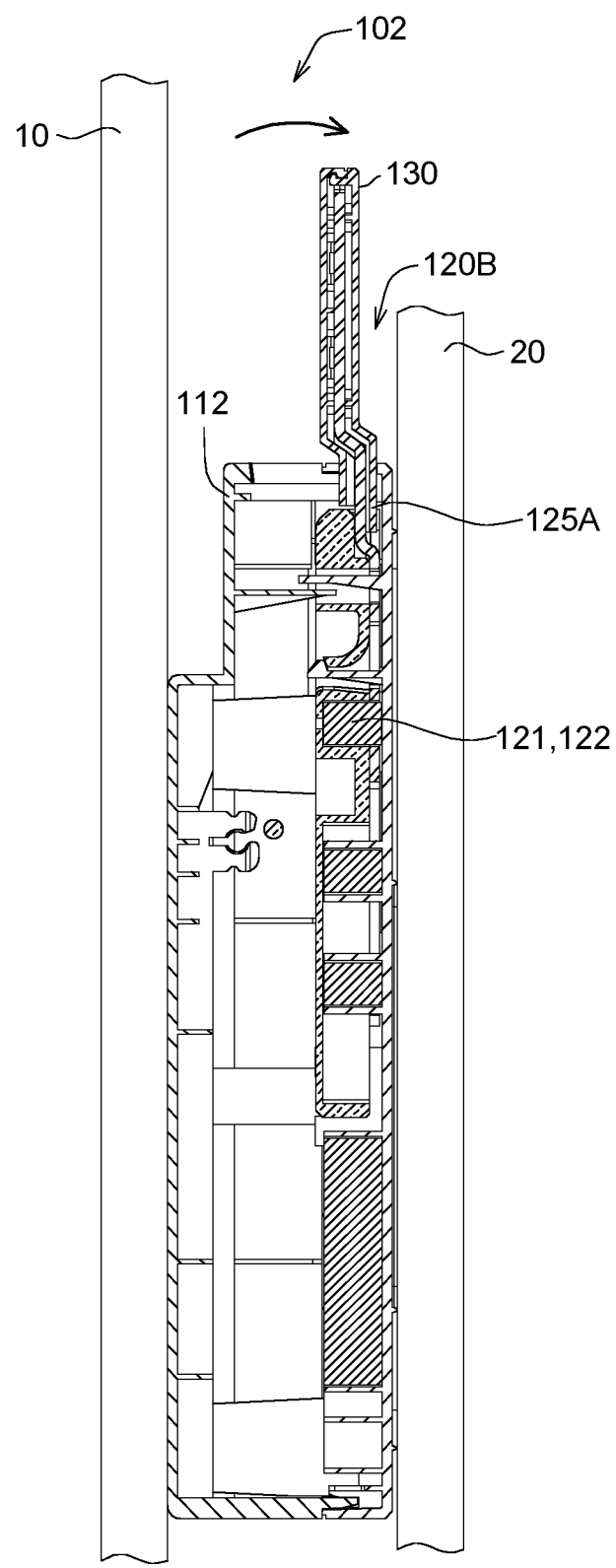
FIGS. 6A and 6B respectively are operation diagrams of an adjustment element of a magnetic template.
Figure 6B:
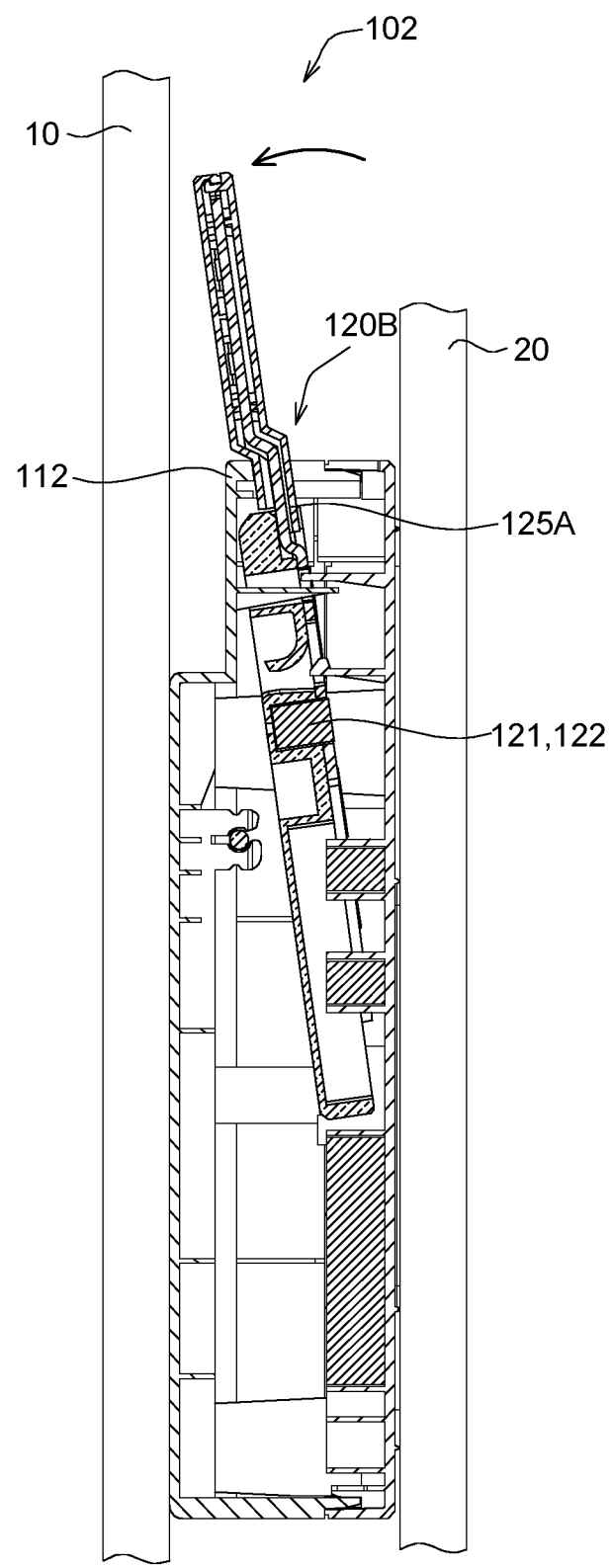

Referring to FIGS. 5A, 5B, 6A and 6B. FIGS. 5A and 5B respectively are explosion diagrams of a magnetic template 102 according to an embodiment of the present invention. FIGS. 6A and 6B respectively are operation diagrams of an adjustment element 120B of the magnetic template 102.

Like the first embodiment and the second embodiment disclosed above, the magnetic template 102 includes an assembly shell 110 and an adjustment element 120B. The magnetic elements 121-124 are disposed inside the assembly shell 110. The adjustment element 120B is arranged in the assembly shell 110 and is configured to adjust the magnetic force of the magnetic elements 121-122 relative to the plane 20. Additionally, the magnetic template 102 may further include an operation element 130 configured to operate the adjustment element 120B. The magnetic elements 121-124 can be implemented by such as permanent magnets or electromagnets.

The adjustment element 120B may include a moving plate 125A and a shaft supporting frame 126A. The moving plate 125A is disposed on the upper cover 111. One end of the moving plate 125A (such as upper end) can move between the first position and the second position relative to the upper cover 111, and the other end of the moving plate 125A (such as lower end) has a shaft 125B hinged to the shaft supporting frame 126A. The shaft supporting frame 126A is arranged on an inner side of the upper cover 111 of the assembly shell 110 and supports two ends of the shaft 125B such that the shaft 125B can rotate.

As indicated in FIGS. 5A, first magnetic elements 121 and second magnetic elements 122 are disposed on the moving plate 125A. As indicated in FIG. 5B, third magnetic elements 123 and fourth magnetic elements 124 are disposed on an inner side of the upper cover 111. Since the distance between the moving plate 125A and the upper cover 111 varies with the position of the moving plate 125A (horizontal movement), the adjustment element 120 of the present embodiment can change the magnetic force of the magnetic elements 121-122 relative to the plane 20 by adjusting the attraction distance of the magnetic elements 121-122 relative to the plane 20.

As indicated in FIG. 6A, when the operation element 130 drives the moving plate 125A to the first position, the magnetic elements 121-122 disposed on the moving plate 125A are close to a plane 20, such that the magnetic elements 121-122 and the plane 20 are placed at relative closer attraction position, and the magnetic force of the magnetic elements 121-122 relative to the plane 20 is stronger. As indicated in FIG. 6B, when the operation element 130 drives the moving plate 125A to the second position, the magnetic elements 121-122 disposed on the moving plate 125A are farther away from the plane 20, such that the magnetic elements 121-122 and the plane 20 are placed at relative farther attraction positions, and the magnetic force of the magnetic elements 121-122 relative to the plane 20 is weaker. When the moving plate 125A is located at the second position, the magnetic force of the first magnetic element 121 and the second magnetic element 122 relative to the plane 20 is weaker, but the magnetic force of the third magnetic elements 123 and the fourth magnetic elements 124 located on two sides and underneath of the moving plate 125A are not weakened and are able to temporarily fix the display 10, such that the user can detach the display 10 and the magnetic template 102 from the plane 20 under the attraction of a smaller magnetic force.

Like the embodiments disclosed above, the adjustment element 120B of the present embodiment may include a buckling piece 132, a buckling switch 134 and an elastomer 136. The operations of these elements are already disclosed above except that vertical arrangement is changed to horizontal arrangement, and the similarities are not repeated here.

Figure 7:
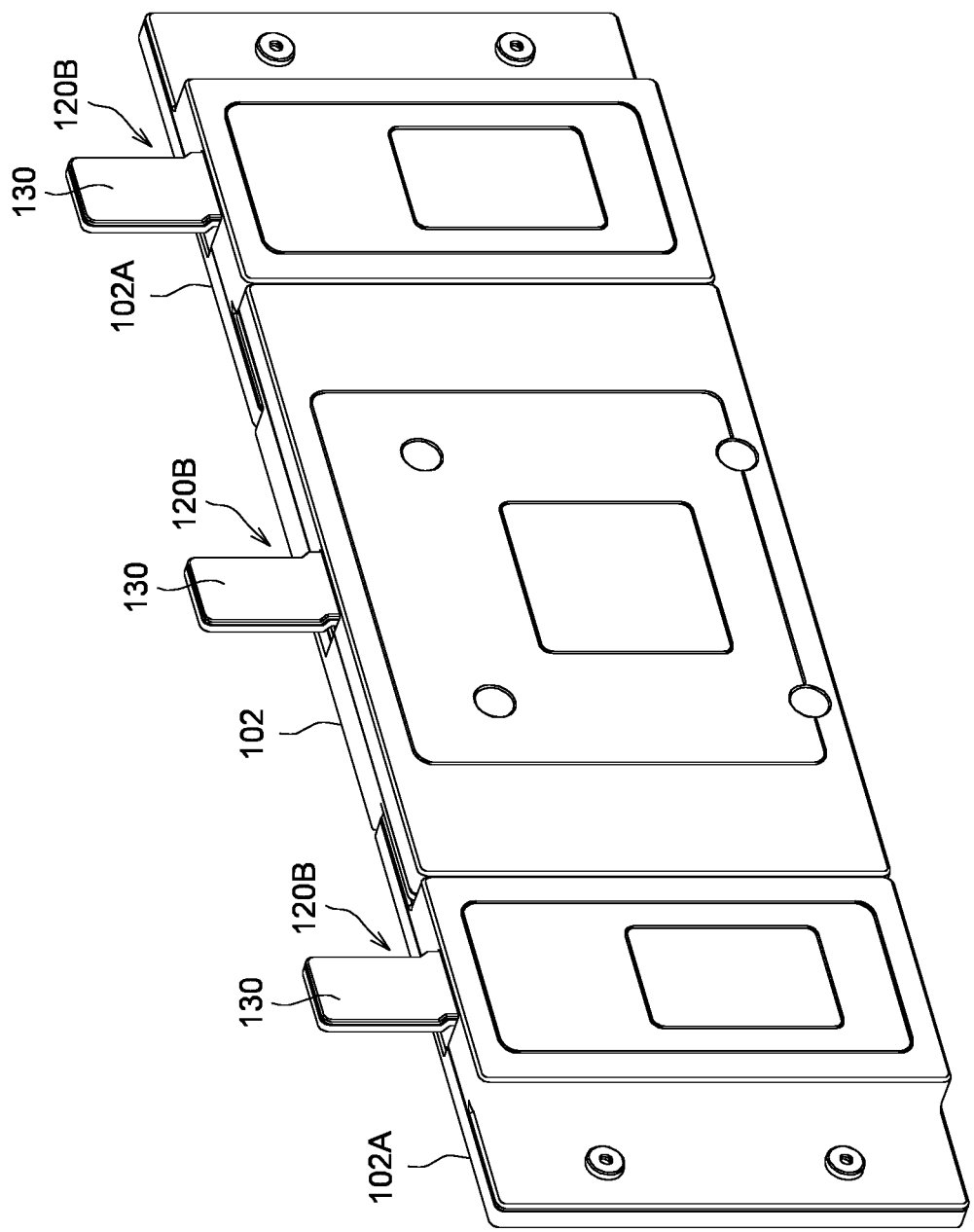
FIG. 7 is a schematic diagram of a magnetic template according to another embodiment of the present invention.

Referring to FIG. 7, a schematic diagram of a magnetic template 103 according to another embodiment of the present invention is shown. Like the embodiments disclosed above, the adjustment element 120B of the present embodiment can change the magnetic force of the magnetic element by adjusting the attraction distance of the magnetic element relative to the plane 20. In the present embodiment, the number of adjustment elements 120B is pleural, and there are two extra magnetic templates 102A in addition to the original magnetic template 102. The user can, according to actual needs, increase the number of adjustment elements 120B and the magnetic force of the magnetic element relative to the plane 20, such that the display with even larger size or weight can be supported and multi-stage adjustment of the magnetic force relative to the plane 20 can be achieved.

Figure 8:
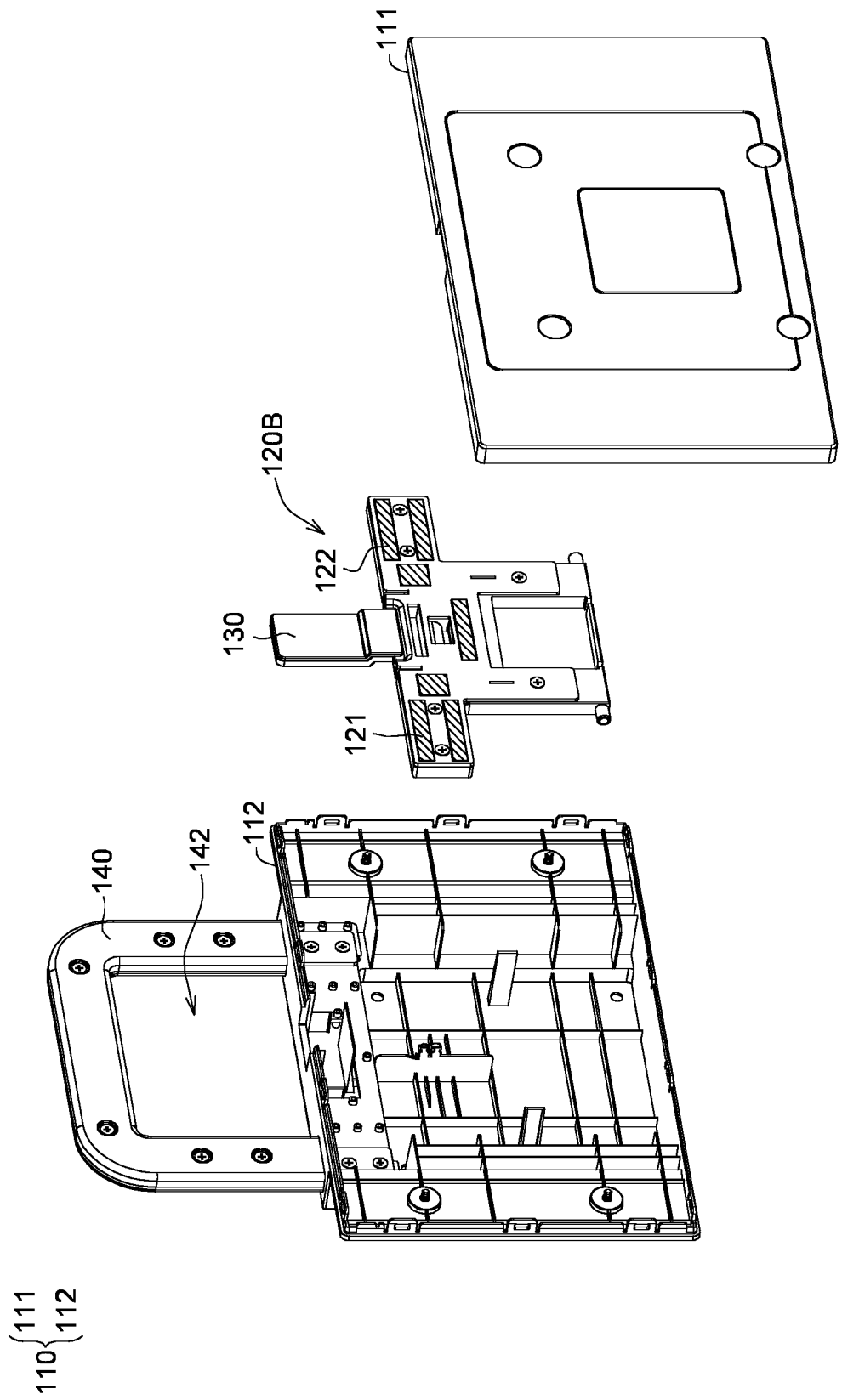
FIG. 8 is a schematic diagram of a magnetic template according to another embodiment of the present invention.

Referring to FIG. 8, a schematic diagram of a magnetic template 104 according to another embodiment of the present invention is shown. The present embodiment is different from above embodiments in that the magnetic template 104 of the present embodiment further includes a handle 140 arranged on the assembly shell 110. The handle 140 is protruded upwards from the assembly shell 110 and has an opening portion 142. The user can hold the handle 140 through which a force can be applied. The handle 140 provides better portability. When the user wants to install or detach the display 10, the handle 140 can avoid the user applying too much force on the top and bottom of the display 10 and causing damage to the display 10.

The operation element 130 disclosed in above embodiments can also be used as a handle for the user to hold and to apply a force. Or, another handle 140 can be arranged on the assembly shell 110. The opening portion 142 of the handle 140 is opposite to the operation element 130, and the user, when holding the handle 140, can poke the operation element 130 and operate the magnetic template 104 more conveniently.

Figure 9:
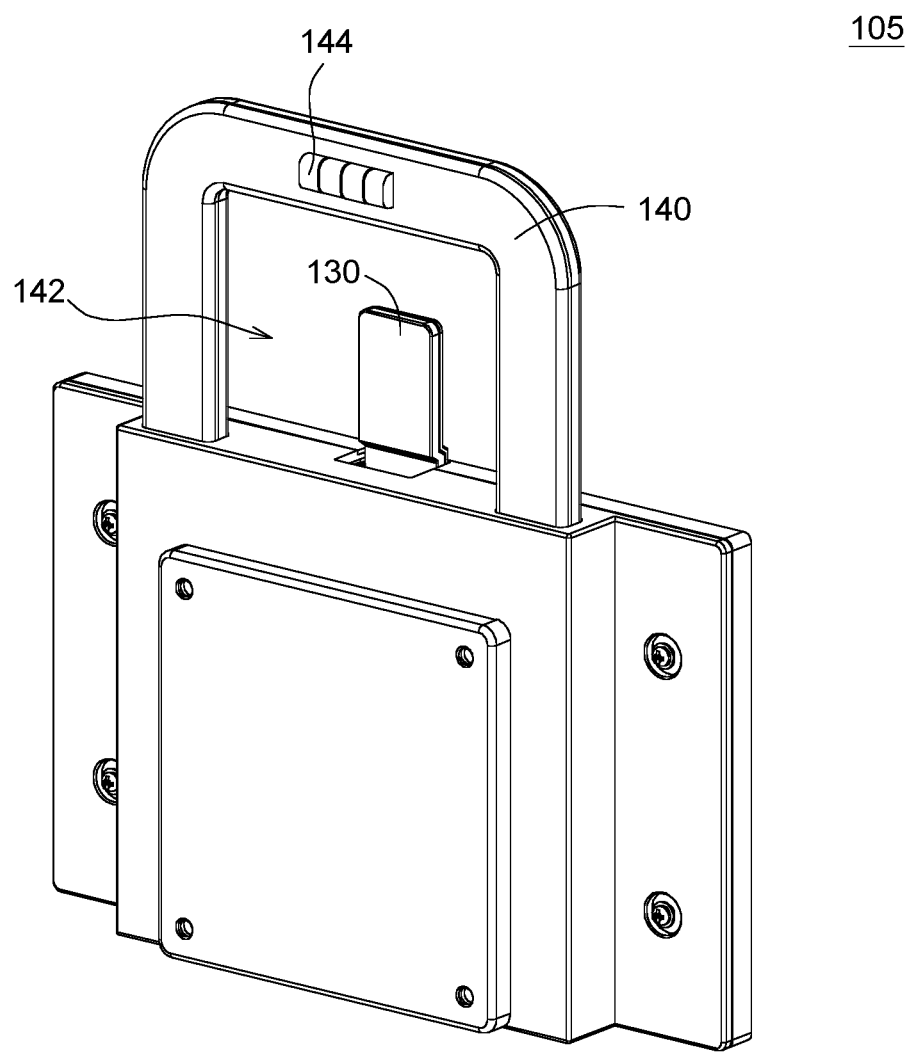
FIG. 9 is a schematic diagram of a magnetic template according to another embodiment of the present invention.

Referring to FIG. 9, a schematic diagram of a magnetic template 105 according to another embodiment of the present invention is shown. The present embodiment is different from above embodiments in that the magnetic template 105 of the present embodiment further includes a spirit level meter 144 configured to measure a tilt angle. The spirit level meter 144 can be disposed on the magnetic template 105. For example, the spirit level meter 144 can be disposed the handle 140 which can be easily seen with human eyes. In other embodiments, the spirit level meter 144 can further be disposed on the display. When the user arrange the display 10, the user can adjust the level of the display 10 with the spirit level meter 144 to facilitate the installation of the display 10.

According to the magnetic template with adjustable magnetic force and the display device using the same disclosed in above embodiments of the present invention, a magnetic template is arranged on the display device according to consumers' needs to magnetically fix the display device on a plane to save installation time. Meanwhile, the magnetic template, possessing the qualities of light weight, smaller space, and portability, meets the requirements of convenience and flexibility.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A magnetic template with adjustable magnetic force applied to a display device, wherein the display device can be fixed on a plane by the magnetic template, comprising:
    an assembly shell having a magnetic element disposed therein;
    an adjustment element disposed in the assembly shell and configured to adjust a magnetic force of the magnetic element relative to the plane or to adjust the magnetic force of the magnetic element; and
    an operation element configured to operate the adjustment element, so that the adjustment element can move between a first position and a second position in the assembly shell, and a moving direction of the adjustment element is not perpendicular to the plane.

2. The magnetic template according to claim 1, wherein the adjustment element comprises:
    a sliding plate movable between the first position and the second position; and
    a shield disposed on the opposite side of the sliding plate and formed of a material selected from elements of the iron group,
    wherein, the magnetic element is disposed on the sliding plate,
    when the operation element drives the sliding plate to the first position, the shield and the magnetic element are not located at relative attraction positions;
    when the operation element drives the sliding plate to the second position, the shield and the magnetic element are located at relative attraction positions.

3. The magnetic template according to claim 2, wherein the adjustment element further comprises an elastomer disposed on one side of the sliding plate; when the operation element drives the sliding plate to be closer to or farther away from the elastomer, the elastomer provides a resilience to the sliding plate.

4. The magnetic template according to claim 2, wherein the adjustment element further comprises a buckling piece and a buckling switch; the buckling piece is disposed on the sliding plate and is opposite to the buckling switch in a moving direction; when the buckling piece and the buckling switch are in one of a separated state and a buckled state, the sliding plate is located at the first position; when the buckling piece and the buckling switch are in another one of the separated state and the buckled state, the sliding plate is located at the second position.

5. The magnetic template according to claim 1, wherein the adjustment element comprises:
   a sliding plate movable between the first position and the second position; and
   a shield moveably hinged on one side of the sliding plate and formed of a material selected from elements of the iron group,
   wherein, the magnetic element is fixed in the assembly shell,
   when the operation element drives the sliding plate to the first position, the shield and the magnetic element are not located at relative attraction positions; and
   when the operation element drives the sliding plate to the second position, the shield and the magnetic element are located at relative attraction positions.

6. The magnetic template according to claim 5, wherein the adjustment element further comprises an elastomer disposed on one side of the sliding plate; when the operation element drives the sliding plate to be closer to or farther away from the elastomer, the elastomer provides a resilience to the sliding plate.

7. The magnetic template according to claim 5, wherein the adjustment element further comprises a linking rod hinged between the sliding plate and the shield; when the operation element drives the sliding plate to the first position, the shield and the linking rod are in a folded state; when the operation element drives the sliding plate to the second position, the shield and the linking rod are in an unfolded state.

8. The magnetic template according to claim 1, wherein the adjustment element comprises:
   a moving plate, wherein one end of the moving plate is movable between the first position and the second position; and
   a shaft supporting frame disposed on one side of the assembly shell, wherein another end of the moving plate is hinged on the shaft supporting frame;
   wherein, the magnetic element is disposed on the moving plate,
   when the operation element drives the moving plate to the first position, the magnetic element is close to the attraction position of a plane; and
   when the operation element drives the moving plate to the second position, the magnetic element is farther away from the attraction position of the plane.

9. The magnetic template according to claim 8, wherein the operation element is a handle, which is protruded upwards from the assembly shell and has an opening portion.

10. The magnetic template according to claim 8, further comprising a handle disposed on the assembly shell, wherein the handle has an opening portion, and the operation element is protruded upwards from the assembly shell and is opposite to the opening portion.

11. The magnetic template according to claim 1, further comprising a spirit level meter disposed on the magnetic template.

12. A display device, comprising:
    a display; and
    a magnetic template with adjustable magnetic force, wherein the magnetic template is disposed on the display, which is fixed on a plane by the magnetic template, comprising:
    an assembly shell having a magnetic element disposed therein;
    an adjustment element disposed on the assembly shell and configured to adjust a magnetic force of the magnetic element relative to the plane or to adjust the magnetic force of the magnetic element; and
    an operation element configured to operate the adjustment element, so that the adjustment element can move between a first position and a second position in the assembly shell, and a moving direction of the adjustment element is not perpendicular to the plane.

13. The display device according to claim 12, wherein the adjustment element comprises:
    a sliding plate movable between the first position and the second position; and
    a shield disposed on an opposite side of the sliding plate and formed of a material selected from elements of iron group,
    wherein, the magnetic element is disposed on the sliding plate,
    when the operation element drives the sliding plate to the first position, the shield and the magnetic element are not located at relative attraction positions;
    when the operation element drives the sliding plate to the second position, the shield and the magnetic element are located at relative attraction positions.

14. The display device according to claim 12, wherein the adjustment element comprises:
    a sliding plate movable between the first position and the second position; and
    a shield moveably hinged on one side of the sliding plate and formed of a material selected from elements of iron group,
    wherein, the magnetic element is fixed in the assembly shell,
    when the operation element drives the sliding plate to the first position, the shield and the magnetic element are not located at relative attraction positions; and
    when the operation element drives the sliding plate to the second position, the shield and the magnetic element are located at relative attraction positions.

15. The display device according to claim 12, wherein the adjustment element comprises:
    a moving plate, wherein one end of the moving plate is movable between the first position and the second position; and
    a shaft supporting frame disposed on one side of the assembly shell, wherein another end of the moving plate is hinged on the shaft supporting frame;
    wherein, the magnetic element is disposed on the moving plate,
    when the operation element drives the moving plate to the first position, the magnetic element is close to the attraction position of a plane; and
    when the operation element drives the moving plate to the second position, the magnetic element is farther away from the attraction position of the plane.

16. The display device according to claim 15, wherein the operation element is a handle, which is protruded upwards from the assembly shell and has an opening portion.

17. The display device according to claim 15, further comprising a handle disposed on the assembly shell, wherein the handle has an opening portion, and the operation element is protruded upwards from the assembly shell and is opposite to the opening portion.

18. The display device according to claim 12, further comprising a spirit level meter disposed on the magnetic template.

19. The display device according to claim 12, wherein the magnetic template can be detachably disposed on the display by way of VESA standard mounting specification.

* * * * *